United States Patent
Ejima et al.

(10) Patent No.: US 7,564,752 B2
(45) Date of Patent: Jul. 21, 2009

(54) DISC SIGNAL EVALUATION APPARATUS AND DISC SIGNAL EVALUATION METHOD

(75) Inventors: Sumiyo Ejima, Kanagawa (JP); Kazuyoshi Takahashi, Tokyo (JP)

(73) Assignee: Sony Corporation (JP)

(*) Notice: Subject to any disclaimer, the term of this patent is extended or adjusted under 35 U.S.C. 154(b) by 613 days.

(21) Appl. No.: 10/585,584

(22) PCT Filed: Nov. 9, 2005

(86) PCT No.: PCT/JP2005/020988

§ 371 (c)(1), (2), (4) Date: Jul. 10, 2006

(87) PCT Pub. No.: WO2006/057184

PCT Pub. Date: Jun. 1, 2006

(65) Prior Publication Data

US 2008/0285404 A1    Nov. 20, 2008

(51) Int. Cl.
*G11B 5/09* (2006.01)
(52) U.S. Cl. .............. 369/53.13; 369/53.2; 369/59.25; 369/47.17
(58) Field of Classification Search ............ None
See application file for complete search history.

(56) References Cited

U.S. PATENT DOCUMENTS 7,301,875 B2 * 11/2007 Ichimura et al. ......... 369/59.11

2006/0072444 A1 * 4/2006 Engel et al. ............ 369/275.1

FOREIGN PATENT DOCUMENTS

| JP | 60-246066 | 12/1985 |
| JP | 62-214561 | 9/1987 |
| JP | 62-252580 | 11/1987 |
| JP | 02-015469 A | 1/1990 |
| JP | 03-181020 A | 8/1991 |
| JP | 03-288375 | 12/1991 |
| JP | 05-054556 | 3/1993 |
| JP | 07-085608 | 3/1995 |
| JP | 08-241573 A | 9/1996 |
| JP | 09-073660 | 3/1997 |
| JP | 2004-213781 A | 7/2004 |

OTHER PUBLICATIONS

PCT International Search Report for PCT/JP2005/020988 mailed on Dec. 20, 2005.
Notification of Reasons for Refusal; Application No. 2004-340903; Dated: Apr. 17, 2007.

* cited by examiner

*Primary Examiner*—Muhammad N. Edun
(74) *Attorney, Agent, or Firm*—Rader Fishman & Grauer PLLC; Ronald P. Kananen

(57) ABSTRACT

By decoding a formatted 1-77PP signal 22 outputted from a BD-ROM formatter 20 at a high speed, comparing it with original data 34 in a comparator unit 30 and checking authenticity of data from the BD-ROM formatter 20 in real time, it is possible to carry out a check of data outputted from the RD-ROM formatter in real time when exposing the 1-77PP data from the BD-ROM formatter.

7 Claims, 10 Drawing Sheets

FIG. 9A

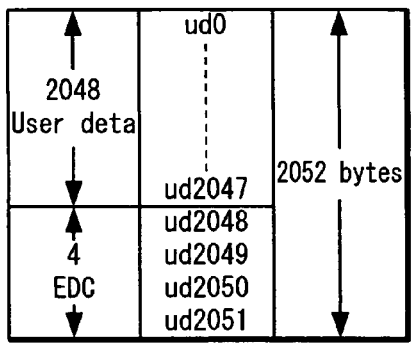

FIG. 9B

| | | codeword 0 | codeword 1 | | codeword L | | codeword 302 | codeword 303 |
|---|---|---|---|---|---|---|---|---|
| 1 LDC codeword =248 bytes | 216 bytes rows with data | e0,0<br>e1,0<br>e2,0<br>⋮<br>e215,0 | e0,1<br>e1,1<br>e2,1<br>⋮<br>e215,1 | | e0,L<br>e1,L<br>e2,L<br>⋮<br>e215,L | | e0,302<br>e1,302<br>e2,302<br>⋮<br>e215,302 | e0,303<br>e1,303<br>e2,303<br>⋮<br>e215,303 |
| | 32 bytes rows with parity | p216,0<br>⋮<br>p247,0 | p216,1<br>⋮<br>p247,1 | | p216,L<br>⋮<br>p247,L | | p216,302<br>⋮<br>p247,302 | p216,303<br>⋮<br>p247,303 |

←—— 304 columns ——→

FIG. 9C

| | | codeword 0 | codeword 1 | | codeword L | | codeword 22 | codeword 23 |
|---|---|---|---|---|---|---|---|---|
| 1 BIS codeword =62 bytes | 30 bytes rows with data | b0,0<br>b1,0<br>b2,0<br>⋮<br>b29,0 | b0,1<br>b1,1<br>b2,1<br>⋮<br>b29,1 | | b0,L<br>b1,L<br>b2,L<br>⋮<br>b29,L | | b0,22<br>b1,22<br>b2,22<br>⋮<br>b29,22 | b0,23<br>b1,23<br>b2,23<br>⋮<br>b29,23 |
| | 32 bytes rows with parity | p30,0<br>⋮<br>p61,0 | p30,1<br>⋮<br>p61,1 | | p30,L<br>⋮<br>p61,L | | p30,22<br>⋮<br>p61,22 | p30,23<br>⋮<br>p61,23 |

←—— 24 columns ——→

FIG. 10A
| Physical Cluster 496*1932cbs | Linking 1932cbs | Linking 1932cbs | Physical Cluster 496*1932cbs | Linking 1932cbs | Linking 1932cbs | Physical Cluster 496*1932cbs |
FIG. 10B
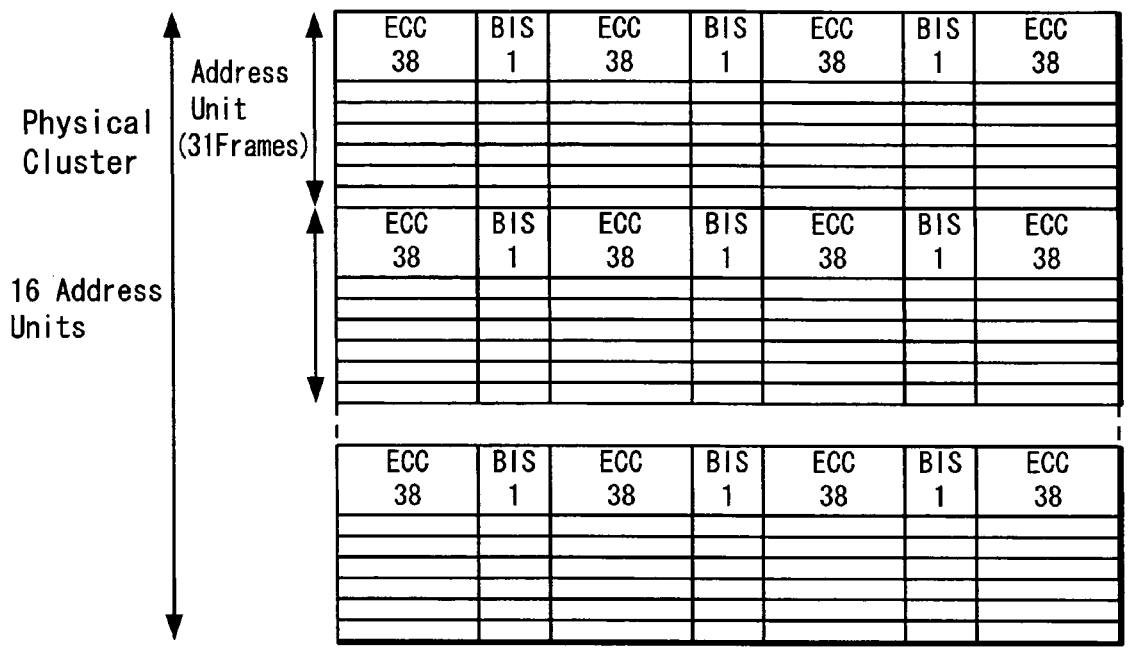
FIG. 10C
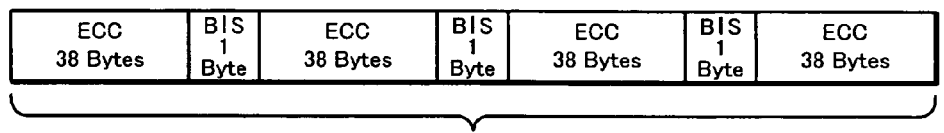
Data Frame
FIG. 10D
FIG. 10E
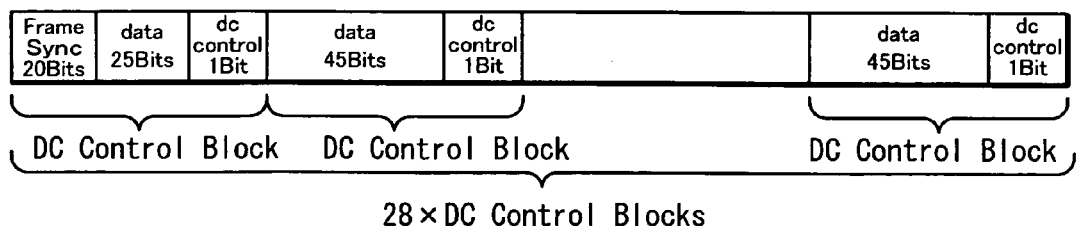
28 × DC Control Blocks

DISC SIGNAL EVALUATION APPARATUS AND DISC SIGNAL EVALUATION METHOD

TECHNICAL FIELD

The present invention relates to a disc signal evaluation apparatus and a disc signal evaluation method for checking various signals of a disc using a bluish-purple laser source and more particularly relates to a disc signal evaluation apparatus and a disc signal evaluation method using a 1-771-77PP system in a record coding system.

BACKGROUND ART

In the past, there have been an optical disc standard "BD-RE" in which a bluish-purple laser diode of 405 nm (hereinafter, inscribed as BD) is made to be a light source and it is possible to rewrite video, music, character data or the like massively on various discs so as to be standardized discs as recordable/reproducible discs, a playback-only optical disc standard "BD-ROM", a write-once optical disc standard "BD-R" and the like, and in particular, in the standard of "BD-RE", "BD-ROM" or the like, the disc thereof is known as a disc on which HDTV (high-definition television) is recordable/reproducible for two hours or more on one side of the disc thereof.

The 1-77PP [1-7 Parity Preserve/Prohibit RMTR (Repeated Minimum Transition Run Length)] which is used as a record coding system of data used in the above-mentioned standard is a system in which parameters of "d" limitation and "k" limitation are applied with 1 and 7 respectively in the encoding of RLL (Run Length Limited) and as the expression in NRZI (Non Return Zero Inverted), "d" and "k" limitations mean that the numbers "0" existing between "1" and "1" become a minimum value of "d" and a maximum value "k" respectively. Prohibit RMTR is a high density signal reproduction processing method and is a method for limiting repetition times the minimum run length in which it is constituted such that they are to be prevented from continuing seven times or more. Also, a Parity Preserve code is a code for realizing DC free and while insertion of a DC control bit is generally carried out after RLL encoding, it is inserted into a source bit string with respect to the Parity Preserve code before the RLL encoding and it is constituted such that conversion becomes possible by keeping the same parity when the source bit is RLL-encoded.

The bit rate of the 1-77PP modulation signal encoded according to the format of the 1-771-77PP system as mentioned above is made to be 66 MHz of the standard (one X speed) and 132 MHz of double speed. A digital processing—jitter analyzer which measures jitter of the 1-77PP modulation signal being compliant with the standard such as of "BD-RE", [BD-ROM] or the like is disclosed in the Non-patent Document 1 (LEADER ELECTRONICS CORP. homepage, http://www.leader.co.jp, LE 1876, digital processing—jitter analyzer, 148 to 149, October 27, Heisei 15 (2003)). Also, with respect to the 1-77PP record encoding format using the above-mentioned 1-77PPrecord coding system, the present applicant disclosed a recording medium for heightening confidentiality of a unique ID in which a unique ID is recorded with respect to a BD disc in the Patent Document 1 (specification of Japanese patent application No. 2004-125893) and there is explained in detail also with respect to the 1-7 record encoding format therein.

Also, a software production system of an optical disc constituted such that a signal before being passed through a formatter of a disc such as a CD and data which are obtained by decoding a signal after being passed through the formatter are to be compared is disclosed in the Patent Document 2 (Japanese Unexamined Patent Publication No. 4-229461).

FIG. 11 shows a software production system 90 of an optical disc described in the Patent Document 2, wherein, in FIG. 11, there are constituted by a high capacity hard disk 92 recorded with software which converts source information of a computer 91, video, music, application program and the like to a predetermined recording format; a RAM 93 for storing software after the software recorded on the hard disk 92 is transferred; an FIFO 94 for adjusting transfer speed of the read out software according to the reproduction order read out from that RAM 93; and a CD-I player 95 for operating the software of this FIFO 94.

The aforesaid RAM 93 has recording capacity of at least the amount of CD-1 disc, for example, capacity of 640M bytes and it is constituted such that data of the amount of CD-1 disc transferred from the hard disk 92 are recorded therein. Also, the CD-1 player 95 is provided with a PC for executing an application of an EMF demodulator, its succeeding error detection, a video signal reproducing circuit or the like. More specifically, according to the software for carrying out conversion to the recording format recorded on the hard disk 92, the computer 91 converts the source information similarly recorded on the hard disk so as to become in conformity to with the CD-1 format.

In FIG. 11, the software recorded on the hard disk 92 is transferred to the RAM 93, and software is read out sequentially from the RAM 93 according to its reproduction order and read out sequentially from the FIFO 94. Reproduction signals which are synchronized with the reproduction of the CD-1 player 95 are outputted from this FIFO 94 and it is constituted such that a reproduction of music and video or execution of a program is to be carried out by the CD-1 player 95. In such a reproduction or an execution, if there is a problem in software which does not carry out evaluation of whether or not the software operates normally, it is constituted such that it is converted to a data format in conformity to with the CD-1 data format and operations for carrying out recording in the RAM 93 are to be repeated until the software comes to operate normally. Consequently, according to the described content of the Patent Document 2, there can be obtained a software production system of an optical disc in which time for evaluation necessary for writing-in software on a write-once optical disc at every time thereof as in a case in the past is shortened.

However, in the digital processing—jitter analyzer described in the Non-patent Document 1 mentioned above, it is directed to measure jitter of a HF 1-7 modulation signal of one X speed (66 MHz) and double speed (132 MHz), but not directed to carry out data check in real time with respect to high speed output data of a high capacity which are formatted on an occasion of BD-ROM recording.

Also, while it is possible to shorten processing time for converting music, video, application program or the like to the software in conformity with the CD-1 data format according to the constitution in the past described in the Patent Document 2 mentioned above, it is directed in the present invention to obtain a disc signal evaluation apparatus and a disc signal evaluation method in which it is possible to carry out a flexible data check in real time with respect to formatted high speed output data of a high capacity which are in conformity with a file system from the BD-ROM logic formatter in which data are recorded by the 1-77PPrecord coding system and the application system standard on an occasion of BD-ROM recording and also to carry out detection of an error by a noise in the BD-ROM logic formatter (signal generator) or the like.

DISCLOSURE OF THE INVENTION

The present invention was invented in order to solve the above-mentioned problem and has a first object to obtain a disc signal evaluation apparatus and a disc signal evaluation method in which an output of a BD-ROM formatter or a signal from return light of a cutting machine is decoded in real time and is compared with original data for evaluation such that it becomes possible to check whether or not a correct signal is generated from the formatter.

Also, it is a second object thereof to obtain a disc signal evaluation apparatus and a disc signal evaluation method in which checksum added by a BD-ROM formatter and an output of the formatter or checksum and a formatter signal from return light of a cutting machine are decoded and are original contents data and the decoded data and checksum are compared such that it becomes possible to check in real time whether or not a correct signal is generated from the formatter.

Further, it is a third object thereof to provide a disc signal evaluation apparatus and a disc signal evaluation method in which an output of a BD-ROM formatter or a signal from return light of a cutting machine is decoded in real time, encrypted contents data are decoded and authenticity of the data is to be checked.

A disc signal evaluation apparatus according to a present first invention is provided, in a disc signal evaluation apparatus for recording data formatted logically according to 1-77PP record coding system on a disc by using a bluish-purple laser source and also for checking the data output of a formatter which were formatted logically according to the 1-77PP record coding system, with processing means for recording the output data from the formatter on a disc and also for carrying out a process in real time, and comparing means for comparing the processed data in the processing means with original data supplied to the formatter, wherein it is constituted such that normal data of the formatter are to be checked according to the comparison result of the comparing means.

A disc signal evaluation apparatus according to a present second invention is provided, in a disc signal evaluation apparatus for recording data formatted logically according to 1-77PP record coding system on a disc by using a bluish-purple laser source and also for checking the data output of a formatter which were formatted logically according to the 1-77PP record coding system, with processing means for recording output data from return light on a disc when recording on the disc and also for carrying out a process in real time, and comparing means for comparing the processed data in the processing means with original data supplied to the formatter, wherein it is constituted such that normal data of the formatter are to be checked according to the comparison result of the comparing means.

A disc signal evaluation apparatus according to a present third invention is provided, in a disc signal evaluation apparatus for recording data formatted logically according to 1-77PP record coding system on a disc with addition of checksum by using a bluish-purple laser source and also for checking data output of a formatter which were formatted logically according to the 1-77PP record coding system, with processing means for recording output data from the formatter on a disc and also for carrying out a process in real time, comparing means for comparing the processed data in the processing means with original data supplying to the formatter, and checksum comparing means for comparing the checksum in incremental steps, wherein it is constituted such that normal data of the formatter are to be checked according to the checksum comparing means.

A disc signal evaluation apparatus according to a present fourth invention is provided, in a disc signal evaluation apparatus for recording data formatted logically according to 1-77PP record coding system on a disc with addition of checksum by using a bluish-purple laser source and also for checking data output of a formatter which were formatted logically according to the 1-77PP record coding system, with processing means for recording output data of return light on a disc when recording on the disc from the formatter and also for carrying out a process in real time, comparing means for comparing the processed data in the processing means with original data supplied to the formatter, and checksum comparing means for comparing the checksum in incremental steps, wherein it is constituted such that normal data of the formatter are to be checked according to the checksum comparing means.

A disc signal evaluation apparatus according to a present fifth invention is provided, in a disc signal evaluation apparatus for recording data formatted logically according to 1-77PP record coding system on a disc by using a bluish-purple laser source and also for checking the data output from a formatter which were formatted logically according to the 1-77PP record coding system, with encryption processing means for applying encryption to the disc for copy protection, decryption processing means for decryption-processing output data of a standard disc which is recorded by the logic formatter, and comparing means for comparing decryption processed data in the decryption processing means with original data supplied to the formatter, wherein it is constituted such that normal data of the formatter are to be checked according to the comparing means.

A disc signal evaluation apparatus according to a present sixth invention is constituted in the first to fifth inventions such that the comparing means is to compare contents in the processed data of the processing means and in the original data.

A disc signal evaluation method according to a present seventh invention is provided, in a disc signal evaluation apparatus for recording data formatted logically according to 1-77PP record coding system on a disc by using a bluish-purple laser source and also for checking the data output from a formatter which were formatted logically according to the 1-77PP record coding system, with a processing step for recording the output data from the formatter on a disc and also for carrying out a process in real time, and a comparing step for comparing the processed data in the processing step with original data supplied to the formatter, wherein it is constituted such that normal data of the formatter are to be checked according to the comparison result of the comparing step.

According to the disc signal evaluation apparatuses and the disc evaluation methods of a first and a second to a seventh present inventions, there can be obtained ones in which it is possible to check the detection of errors of noises or the like in a formatter or on a disc during recording thereon in real time on an occasion when original data are recorded on the disc. According to the disc signal evaluation apparatuses of the third and fourth present inventions, there can be obtained ones in which it is possible to check normal data of the formatter or an abnormal state in a recording state of the disc by detecting the checksum on an occasion of decoding. According to the disc signal evaluation apparatuses of the

BRIEF DESCRIPTION OF DRAWINGS

FIGS. 9A to 9C are explanatory diagrams (I) of the 1-77PP signal format used in the present invention;

FIGS. 10A to 10E are explanatory diagrams (II) of the 1-77PP signal format used in the present invention.

BEST MODE FOR CARRYING OUT THE INVENTION

Figure 1:
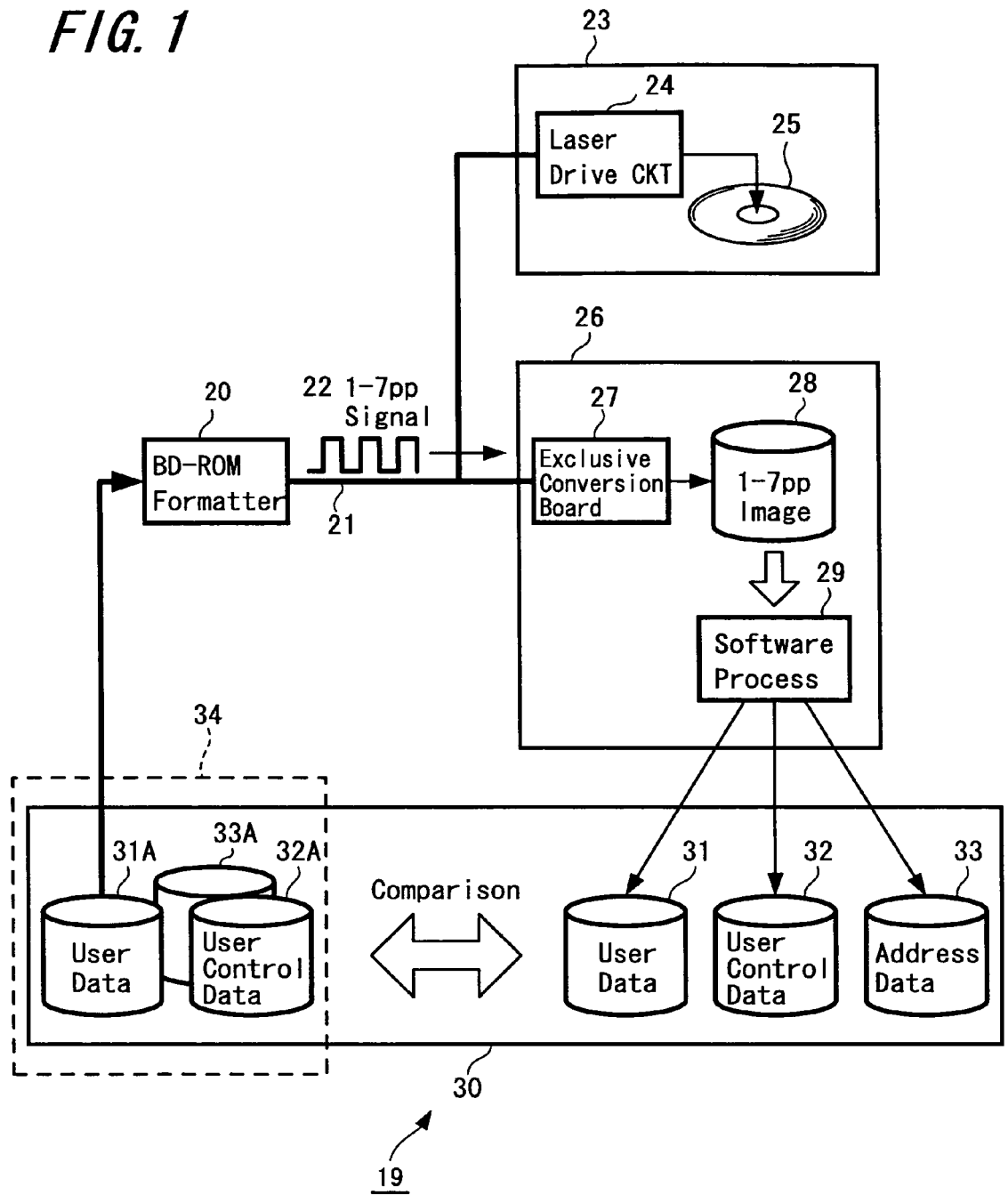
FIG. 1 is a function block diagram of a disc signal evaluation apparatus and a disc signal evaluation method showing one exemplified embodiment of the present invention.
Figure 2:
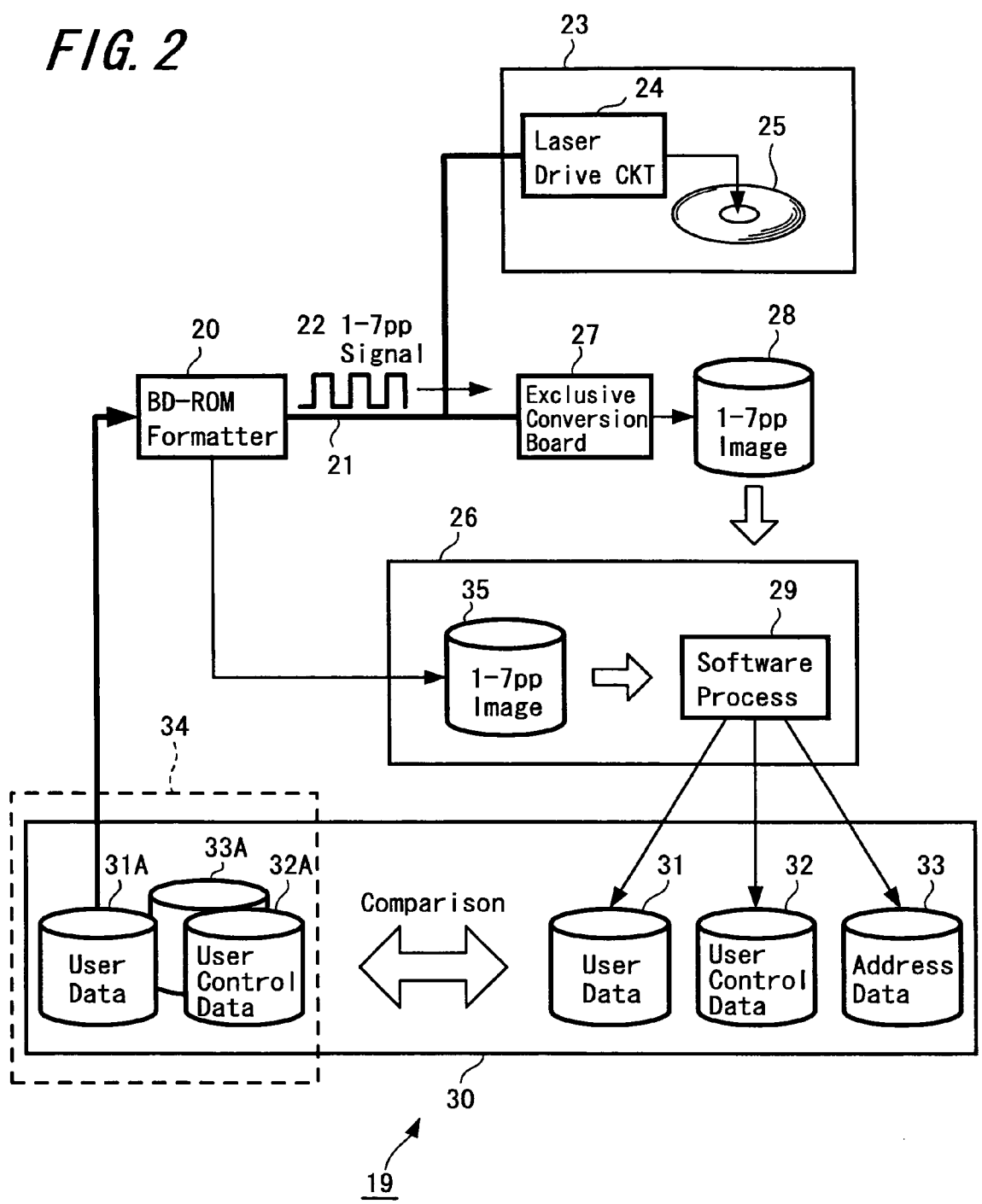
FIG. 2 is a function block diagram of another disc signal evaluation apparatus and a disc signal evaluation method showing another exemplified embodiment of the present invention.
Figure 3:
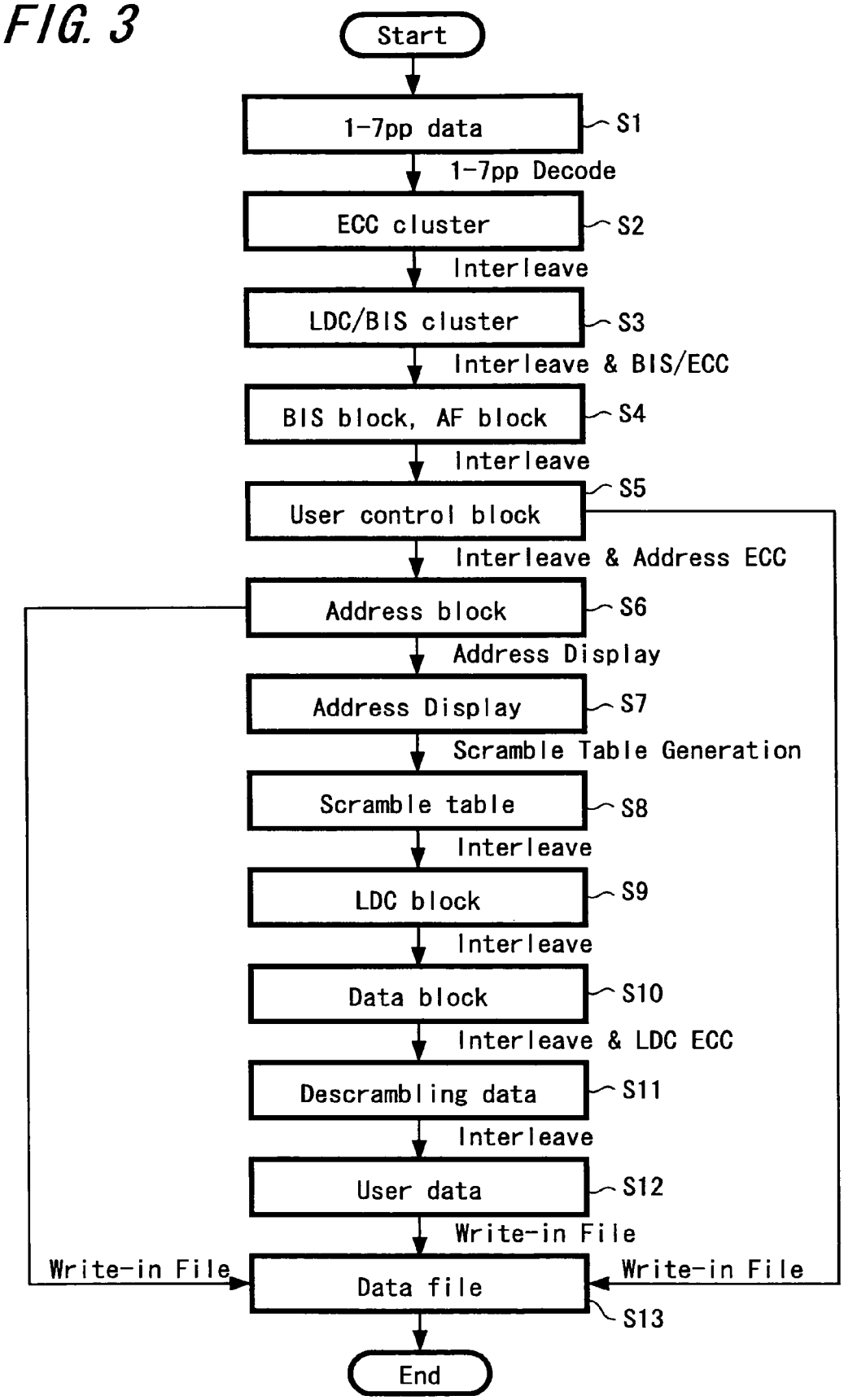
FIG. 3 is a flowchart of a software process used in the disc signal evaluation apparatus and the disc signal evaluation method of the present invention.
Figure 4:
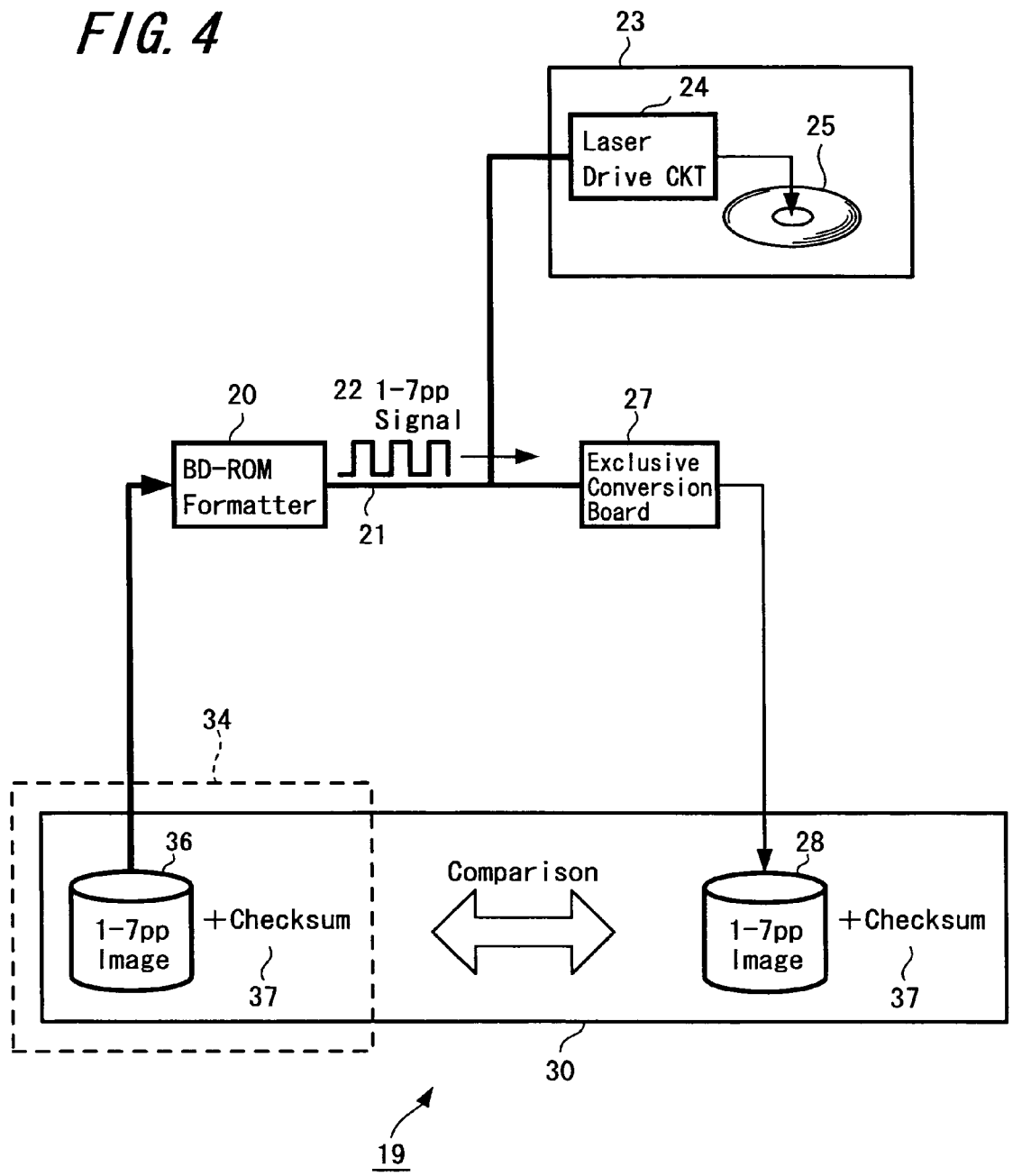
FIG. 4 is a function block diagram of a disc signal evaluation apparatus and a disc signal evaluation method (I) showing still another exemplified embodiment of the present invention.
Figure 5:
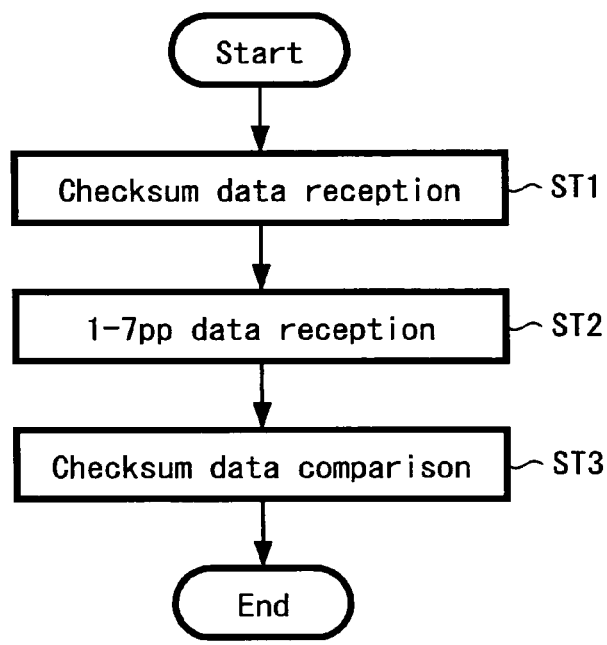
FIG. 5 is a flowchart of a checksum comparing process used in the disc signal evaluation apparatus and the disc signal evaluation method of the present invention.
Figure 7:
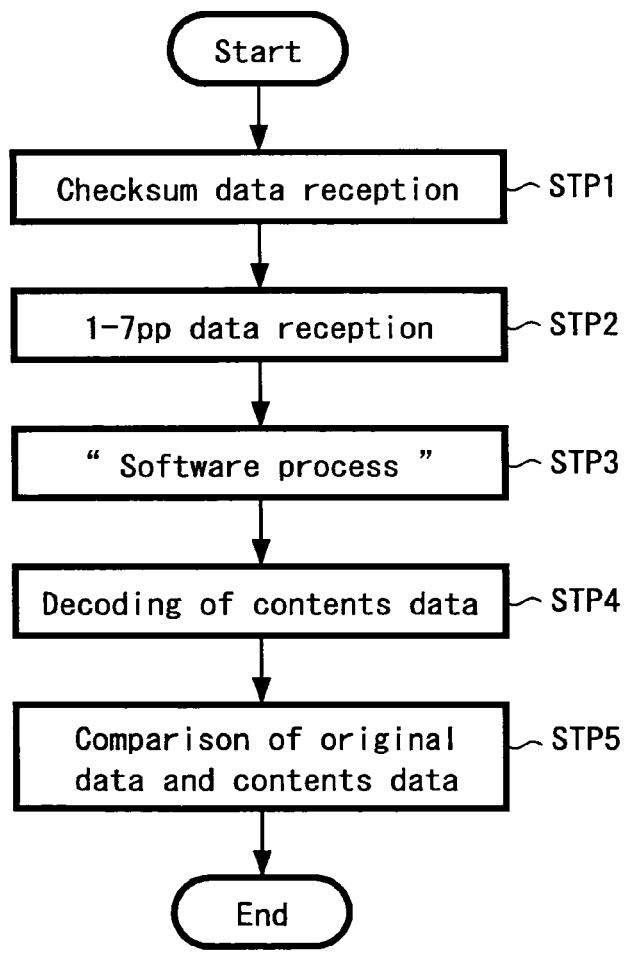
FIG. 7 is a flowchart of an encryption comparing process used in the disc signal evaluation apparatus and the disc signal evaluation method of the present invention.
Figure 6:
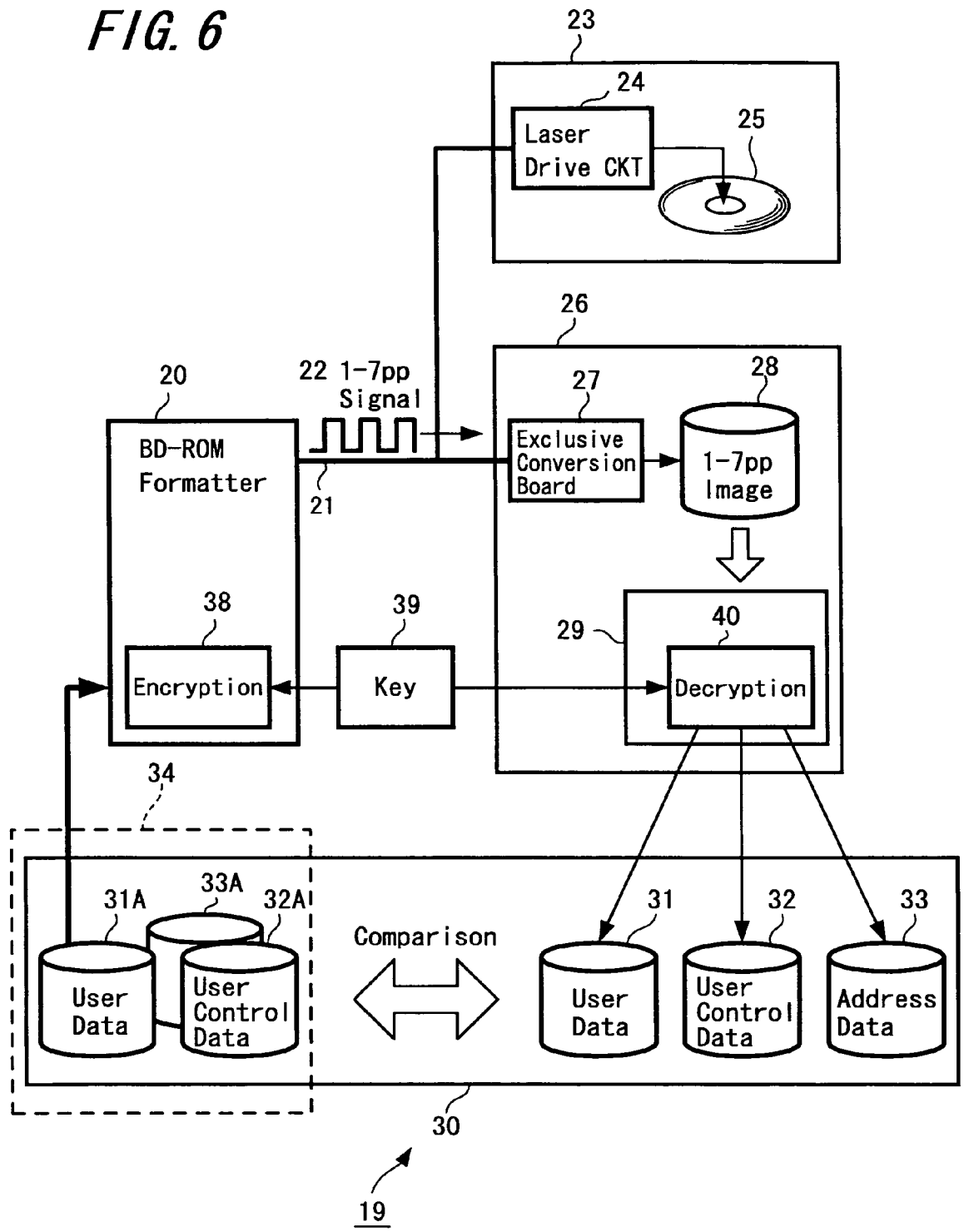
FIG. 6 is a function block diagram of a disc signal evaluation apparatus and a disc signal evaluation method (II) showing still another exemplified embodiment of the present invention.
Figure 8:
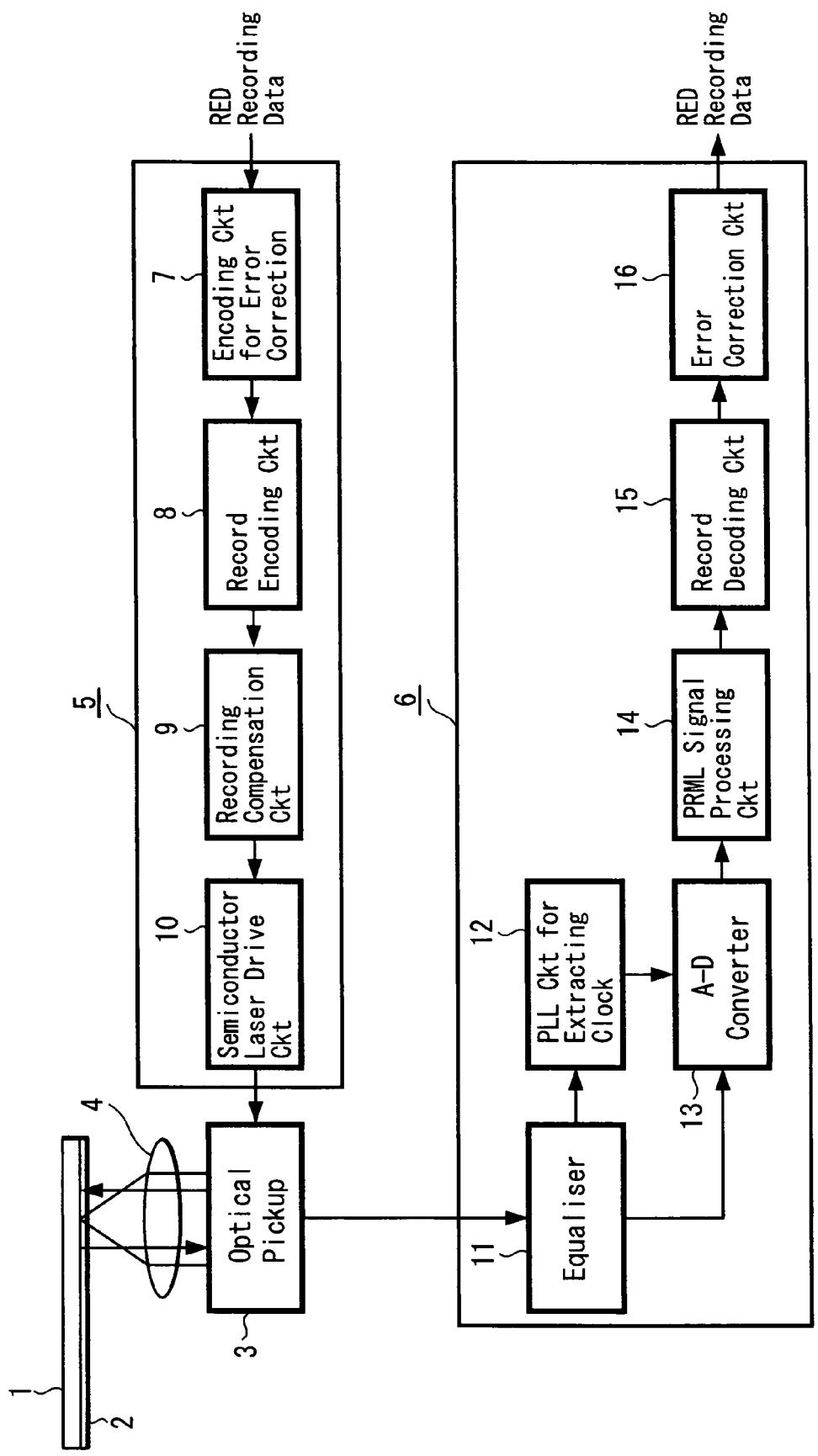
FIG. 8 shows a block of a recording and reproducing apparatus for explaining a 1-77PP encoding circuit and a 1-77PP decryption circuit to be used in the present invention.
Figure 11:
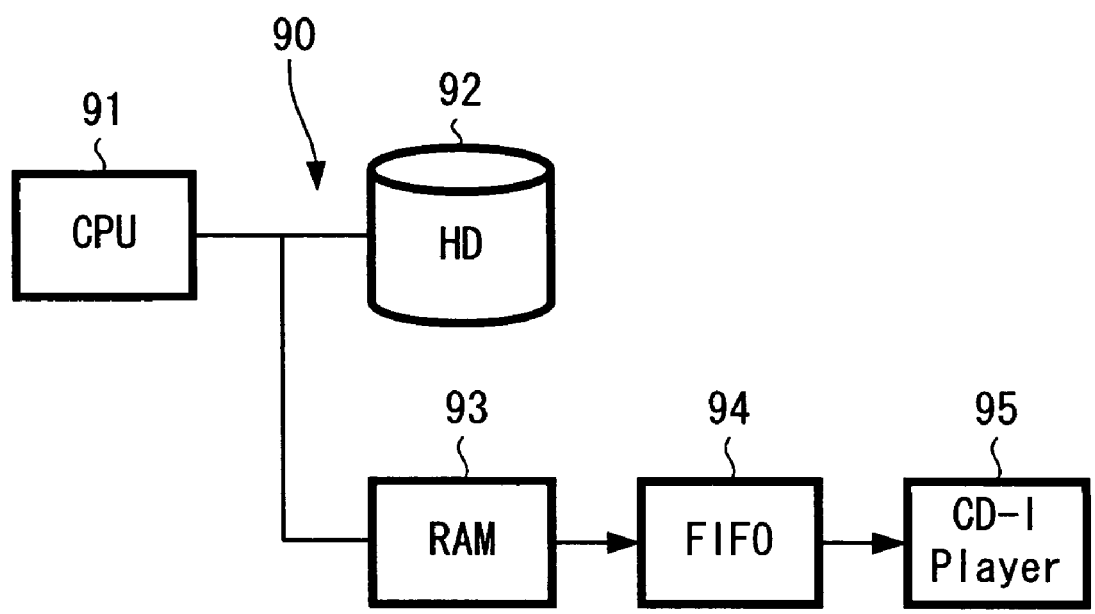
FIG. 11 is a block diagram showing one exemplified embodiment of a disc signal evaluation apparatus in the past.

Hereinafter, one exemplified embodiment of the present invention will be explained according to FIGS. 1 to 8. FIG. 1 is a function block diagram of a disc signal evaluation apparatus showing one exemplified embodiment of the present invention; FIG. 2 is a function block diagram of another disc signal evaluation apparatus showing another exemplified embodiment of the present invention; FIG. 3 is a flowchart showing a software process of data processing means of the present invention; FIG. 4 is a function block diagram (I) of a disc signal evaluation apparatus showing still another exemplified embodiment of the present invention; FIG. 5 is a flowchart showing a checksum detecting process of the present invention; FIG. 6 is a function block diagram (II) of a disc signal evaluation apparatus showing still another exemplified embodiment of the present invention; FIG. 7 is a flowchart showing an encryption process of the present invention; FIG. 8 is a block diagram of a recording and reproducing system using BD; and FIGS. 9A to 9C and FIGS. 10A to 10E are explanatory diagrams of BD-ROM logic format.

It will be explained, prior to explaining a disc signal evaluation apparatus of one exemplified embodiment of the present invention according to FIGS. 1 to 7, with respect to a data recording and reproducing system circuit applied with 1-77PP encoding by using BD laser light and BD-ROM logic format according to FIG. 8 to FIGS. 10A to 10E.

In FIG. 8, 1 shows an optical disc of BD-RE, BD-ROM, BD-R or the like in which it is constituted such that the thickness of the disc is 1.1 mm, the thickness of a cover layer 2 covering a recording face thereof is 0.1 mm, the disc diameter is 12 cm and recording capacity of a single face thereof is made to be in 3 ways of 23.3 G-bytes, 25 G-bytes and 27 G-bytes. 3 shows a BD optical pickup for a 405 nm bluish-purple laser (hereinafter, described as BD3) in which recording and/or reproduction of recording data is carried out through an objective lens 4. 5 shows a recording system circuit and 6 shows a reproducing system circuit.

A recording system circuit 5 carries out two of encoding processes such that reproduction of recording data ReD for video, music and applications becomes easy in which, first, in an encoding circuit for error correction 7, misreading according to disc scratch or the like is restored to correct data by a process of an error correction code (hereinafter, described as ECC <Error Correcting Code>). The ECC block of the encoding circuit 7 for BD is constituted by making 64K bytes user data to be a unit and these user data are protected according to Reed-Solomon code LDC (Long Distance Code) and BIS (Burst Indicator Sub-code). Consequently, it is constituted such that accuracy on an occasion of reading out is to be heightened also with respect to the random error and the burst error by increasing the large scale of ECC block such as 64K bits and the interleave length (dispersion length of codes). The recording data ReD ECC-processed by the ECC encoding circuit 7 are record-encoded by a next record encoding circuit 8.

This record encoding circuit 8 is a circuit for converting a bit string which is desired to be recorded by being record-encoded to channel bits according to a fixed rule and as it is already explained with respect to its detailed system in the Patent Document 1 and in the related art described at the beginning, it is possible according to the 1-77PP record coding system to make a packing of data by a small unit as compared with an EFM (Eight Fourteen Modulation) system used in the CD and it is possible to heighten the modulation efficiency. Also, a detection window width becomes large and detection ability is improved. Further, the low-band signal component becomes fewer and it is possible to maintain the parity before the modulation.

The channel bit string which was record-encoded in the record encoding circuit 8 is produced in an accurate shape as a recording mark on the disc and write-strategy is carried out by a recording compensation circuit 9 for driving a semiconductor laser drive circuit. More specifically, the channel bit record-encoded by the 1-771-77PP system in the record encoding circuit 8 makes the BD3 to oscillate by the waveform produced in a recording compensation circuit 9 through a semiconductor laser drive circuit 10 and records a mark and a space on the optical disc 1 in response to the light modulation strength of the BD3 bluish-purple laser.

Also, a reproduction process in a reproducing system circuit 6 passes a signal read out from an optical pickup 3 through an equalizer 11 and converts it to digital data in an A-D conversion circuit 13 by matching the timing with a clock of a PLL circuit 12 for extracting clocks so as to obtain NRZ data. In the disc 1 for the BD laser, the NRZ data are supplied to a PRML signal processing circuit (Partial Response Maximum Likelihood) 14 at that time and error generation is prevented as much as possible. Next, Viterbi decoding is carried out by a record decoding circuit 15 according to the decoding rule of the 1-771-77PP system and the reproduced data RpD are restored by finally applying error correction by means of an error correction circuit 16. In this error correction circuit 16, random error or burst error is reduced according to Picket code (4 byte strings embedded like poles in ECC block at fixed intervals), LDC or BIS.

Next, it will be explained a brief content with respect to the logic format on an occasion of 1-77PP record-encoding according to FIGS. 9A to 9C and FIGS. 10A to 10E. The recording data ReD recorded on the optical disc 1 are divided into data of 64K bytes and ECC mentioned above is added with respect to each of these divided data, and a basic unit of data referred to as one ECC cluster is formed.

One ECC cluster mentioned above segmentalizes 64K bytes data groups into 32 pieces of data groups and a user data group of 2048 bytes is formed as shown in FIG. 9A and an error detection code (EDC) of 4 bytes is added to each data group of 2048 bytes so as to make a data group of total 2052 bytes.

Next, a predetermined scramble is applied with respect to a data group having these 32 pieces of 2052 bytes as a unit and they are once again returned to original data groups of 32×2052 bytes. Next, as shown in FIG. 9B, the data group of 32×2052 bytes is re-divided into 304 pieces of data groups having a mass of 216 bytes respectively. ECC of 32 bytes is added to each of the re-divided data groups. Finally, a predetermined interleaving is carrying out so as to carry out rearrangement thereof and the ECC cluster is completed. For the ECC of the ECC cluster, an encoding system of a Reed-Solomon code having a unit by byte is used.

In the above-mentioned ECC cluster, error correction of 16 bytes/248 bytes is carried out by adding a 32 bytes Reed-Solomon code with respect to a 216 bytes data group. Also, for the optical disc 1, there exists a BIS cluster other than the above-mentioned ECC cluster and this BIS cluster is a data unit in which the number designating a function of the recorded information or the like is recorded in the number of the ECC cluster which is referred to as address or in the ECC cluster which is referred to as user control.

A concrete constitution of the BIS cluster forms an address constituted by 4 bytes information designating an address number, 1 bytes information which is an adding data and ECC according to a 4 bytes Reed-Solomon coding code. Data groups each of which has 30 bytes obtained by combining the address data of those 9 bytes and the user control of 21 bytes are formed as many as 24 pieces as shown in FIG. 9C. Next, 32 bytes ECC is added with respect to each of the 30 bytes data groups and finally, rearrangement is carry out by a predetermined interleaving and the BIS cluster is completed.

The physical format of the optical disc is constituted as shown in FIG. 10A such that there are repeated a physical cluster recorded with data which are combined with the ECC cluster and the BIS cluster and two of the ringing for connecting this physical cluster.

Each physical cluster is divided into blocks referred to as 16 pieces of address units as shown in FIG. 10 (B). Further, each address unit is divided into 31 pieces of data frames and the ringing is constituted by 2 pieces of data frames.

155 bytes information is recorded in the data frame as shown in FIG. 10 (C). In the data of the data frame, 3 bytes of the 39th bytes, the 78th bytes and the 117th bytes are BIS cluster information and other 152 bytes are ECC cluster data. It should be noted in the BIS cluster that address data and user control data are included therein in which the address is included in the BIS cluster of the first three data frames in each address unit and the user control data are included in the other remaining BIS cluster.

Also, as shown in FIG. 10 (D), there divided for each data frame into total 28 pieces of data groups in which by making real data to be at the head, 25 bits are made to be one data group and the remaining is made to be data groups for every 45 bits.

With respect to the data frame, as shown in FIG. 10 (E), only the head portion thereof is constituted by a 20 bits frame synchronizing signal, 25 bits real data and 1 bit DC control bit and others are divided into 28 pieces of DC control blocks each of which is constituted by 45 bits real data and a 1 bit DC control bit. Here, in the 1 bit DC control bit at the terminal end of each the block, the bit value thereof is determined such that the absolute value of the index digital sum value (DSV) will approach "0".

There is shown a functional block in FIG. 1 in which while a BD-ROM formatter 20 outputting 1-77PP data (hereinafter, described as 1-77PP signal) 22 which is formatted according to the above-mentioned logic format carries out mastering of a master disc for a BD-ROM as a BD medium through a coaxial cable 21, the check of the BD-ROM formatter 20 is to be carried out flexibly in real time.

In FIG. 1, the 17-PP signal 22 supplied to a mastering unit 23 from the BD-ROM 20 through the coaxial cable 21 is supplied to a laser drive circuit 24 and exposures organic resist applied on a glass master board on a movable table. As this exposure method, an electron beam (EB) exposure, Deep UV using an ultraviolet laser having 260 nm wavelength, PTM (Phase Transition Mastering) using a bluish-purple laser having around 400 nm wavelength or the like is used, a master board which is formatted for the BD-ROM is obtained, a stamper is created based on this master board, and a BD-ROM 25 is formed by injection.

In a disc signal evaluation apparatus 19 of the present invention, a software process is carried out according to a software processing unit 26 by a computer (hereinafter, described as PC which is not shown) in this apparatus 19. More specifically, the 1-77PP signal 22 of one X speed (66 M bits) and double speed (132 M bits) from the BD-ROM 20 is applied with serial-parallel conversion (S-P) in an exclusive conversion board 27 and the 1-77PP signal 22 is to be collected in real time. Also, it is attempted in this exclusive conversion board 27 to realize a high speed operation for taking in the 1-77PP signal 22 by using DMA (Direct Memory Access). Also, a further higher speed process is realized by means of multithread in which efficient utilization of resource on an occasion of arithmetic processing is made possible by using a PC equipped with a plurality of and at least two of CPUs.

With respect to 1-77PP image data 28 which are S-P converted in the software processing unit 26, it is detected in real time whether or not the data outputted from the BD-ROM 20 is correct and checkable data are obtained by comparing processed data of user data 31, user control data 32, address data 33 and the like which are picked out according to a software process 29 shown in a flowchart of FIG. 3 to be described hereinafter in a comparator unit 30 with respect to user data 31A, user control data 32A, address data 33A and the like which are original data 34 before being formatted in the BD-ROM formatter 20 according to the CPU of the PC.

In the above-mentioned constitution, it was explained about a case in which the output of the BD-ROM 20 inputted to the software processing unit 26 and comparing with the original data 34 is carried out, but it may be constituted such that return light for a monitor when exposing onto the base for the BD-ROM 25 of the mastering unit 23 is picked up, supplied to the exclusive conversion board 27 and authenticity of the data from the BD-ROM 20 is to be checked.

FIG. 2 is a function block showing another constitution of the present invention, wherein the same reference numerals are put for the corresponding portions with respect to FIG. 1 and repetitive explanation will be omitted. It is constituted such that the data constituted by the 1-77PP format before the BD-ROM formatter 20 outputs can be processed in a high speed in real time processing by processing the 1-77PP image data stored in a high capacity file 35 in the software processing unit 26 in the software process 29 and by carrying out the check thereof flexibly and further, such that the original contents data 34 of the signal source and the decoded user data 31, user control data 32 and address data 33 are compared in the comparing unit 30 so as to check the authenticity of the data.

A processing flow of the software processing unit 26 shown in FIG. 1 and FIG. 2 mentioned above will be explained according to FIG. 3. In a first step S1 of FIG. 3, the 1-77PP image data 28 and 35 are decoded; in a second step S2, ECC is added and an ECC cluster is obtained; this ECC cluster is applied with interleave and thereafter; in a third step S3, LDC and BIS are added; and an LDC/BIS cluster is obtained.

In the third step S3, ECC is added to the BIS cluster; the BIS/ECC is applied with interleave; in a fourth step S4, a BIS block and an AF block are obtained; thereafter, interleave is applied thereto; and a user control block is obtained such as in a fifth step S5. This user control block is written-in in a data file as shown in a thirteenth step S13; at the same time, ECC is added to the address; interleave is applied thereto; and an address block is obtained in a sixth step S6. This address block is written-in in a data file as shown in the thirteenth step S13. Also, this address block is supplied to an address display shown in a seventh step S7.

In the address display, a scramble table is generated; in an eighth step S8, a scramble table is obtained; interleave is applied thereto; in a ninth step S9, it is made to be an LDC block; this LDC block is applied with interleave; and a data block is obtained such as in a tenth step S10. This data block is applied with interleave together with the LDC and the ECC; they are made to be descrambling data such as in an eleventh step S11; these descrambling data are further applied with interleave; and user data are obtaining such as in a twelfth step S12. These user data are written-in a file and a data file is obtained such as in the thirteenth step S13.

FIG. 4 is a function block showing a comparing method by checksum which shows still another constitution of the present invention and FIG. 5 is a drawing showing the flowchart thereof. Hereinafter, in FIG. 4, the same reference numerals are put for the portions corresponding to those in FIG. 1 and FIG. 2 and the repetitive explanation thereof will be omitted.

An exposure apparatus of a disc signal evaluation apparatus in FIG. 4 is constituted such that the 1-7 image data 28 are picked out and the checksum is to be carried out in which the BD-ROM 20 is supplied with an output added with checksum 37 which is obtained by totaling bit numbers of the 1-7 image data 36 of the original data 34 with respect to the last bit of each of the unit data. The 1-7 image data 28 outputted from the BD-ROM formatter 20 through the exclusive conversion board 27 is compared with the checksum of the original data 34 by the CPU in the PC. For the checksum added to these 1-77PP image data, ECC is also possible other than EDC. Also, other than adding it to the 1-7PP image data, it is possible to add it to each of the contents data, to a signal of image data or the like before the 17PP conversion or to an arbitrary place of an encode sequence. It may be constituted such that this technology will be transplanted to a reproduced BD-ROM disc signal evaluation apparatus.

FIG. 5 shows one example of a flowchart of FIG. 4, wherein a check of real time data is carried out by comparing the checksum (first step ST1) and the 1-77PP image data (second step ST2) which the CPU of the PC received from the BD-ROM formatter 20 with the checksum of the original data 34 in the comparator unit 30 for every unit data in incremental steps as shown in a third step ST3.

FIG. 6 is a function block showing an encryption method which shows still another constitution of the present invention and FIG. 7 is a drawing showing the flowchart thereof. Hereinafter, in FIG. 6, the same reference numerals are put for the portions corresponding to those in FIG. 1 and FIG. 2 and the repetitive explanation thereof will be omitted.

In FIG. 6, reference numerals 20 to 34 are the same elements as those of FIG. 1. The original data 34 are encrypted in an encryption processing unit 38 in the BD-ROM formatter 20, the 1-77PP signal 22 is exposed and S-P converted concurrently, is processed in the software process 29 in the software processing unit 26 and at the same time, a decryption process is carried out by an encryption key 39. The user data 31, user control data 32 and address data 33 for which the decryption process was finished are compared with the user data 31A, user control data 32 and address data 33A of the original data 34 in the comparator unit 30, the encrypted contents data are evaluated by the signal level, and a disc signal evaluation apparatus in which data can be checked in real time is obtained.

Also, when encryption of contents data for copy protection is carried out for the reason of copy right protection and if decoding of the contents data is carried out by passing a normally manufactured disc through the disc evaluation apparatus and a disc evaluation is to be carried out, it is possible to pick out contents data after the decryption in the signal evaluation equipment, so that the check whether or not the 1-77PP signal data which the BD-ROM formatter 20 generated is a signal of the desired contents can be carried out before the process for manufacturing the disc.

FIG. 7 shows one example of a flowchart of FIG. 6, wherein in a first step STP1, the CPU of the PC receives the encryption key 39 from the BD-ROM formatter 20. In a second step STP2, the 1-77PP image data are received from the BD-ROM formatter 20. In a third step STP3, the software process 29 which was explained in FIG. 3 is executed in the software processing unit 26. In a next fourth step STP4, decoding 40 of the contents data is carried out. In a fifth step STP5, authenticity check of real time data is carried out by comparing the original data of the original data 34 and the contents data in the comparator unit 30.

According to the present invention, it is possible to check in real time whether or not a correct signal is generated from the formatter by evaluating an output of a BD-ROM formatter or return light of a cutting machine. Also, it is possible to check the authenticity of the data in real time by comparing checksum of contents data which are obtained by decoding a signal from an output of a BD-ROM formatter or from return light of a cutting machine in real time with the checksum of the original data. Further, a disc signal evaluation apparatus and a disc signal evaluation method is obtained in which it is possible to check the authenticity of the data in real time by decoding a signal from an output of a BD-ROM formatter or from return light of a cutting machine and by decoding the encrypted contents data.

INDUSTRIAL APPLICABILITY

It was explained in each embodiment mentioned above about a case in which each process of all the interleave processes of the software process 29 in the software processing unit 26, the 1-77PP inverse conversion process, the scramble process, the synchronizing signal detection process and the like is preformed by an arithmetic process, but it may be constituted such that a high speed constitution of the software process is to be attempted by making these of respective processes to be by tables and by making reference to these tables.

For such tables, there exist the followings:
 frame sync pattern check for table
 17PP inverse conversion table
 data block/de-interleave for table
 unit control block/de-interleave for table
 access block/de-interleave for table
 BIS de-interleave for table
 LDC de-interleave for table
 ECC for table
 EDC for table
 scramble data for table
 or the like And in a normal decoding process, a sequential arithmetic operation is enough, but it becomes possible to attempt a further high speed making by using these of tables for data conversion.

Also, a high speed processing is made to be possible according to a flow omitting ECC, if necessary, in which it takes time with respect to a software process for attempting simplification of algorithm and further, it is also possible to realize a high speed processing by attempting standardization of the scramble table reference and by unifying the routine using the scramble table by a plurality of times on an occasion of the evaluation of the data format. Furthermore, it may be constituted by comparing with the source data corresponding to the necessity thereof after saving each of data such that a further higher speed process is realized by making the comparing of the data after being processed and the contents data which are the input of the formatter to be a different process or by making a portion or all of the processes which perform software processes in the present invention to be hardware constitution.

Also, the present invention is applicable to a system in which an address display or the like is carried out from the 1-77PP signal and it is made to be a real time monitor to be used for checking operating conditions in a plant or to a system in which by transplanting to a check system by the drive for reproducing a medium, not only the output signal of the system realized as evaluation equipment of a disc as a medium or of the formatter of the BD-ROM, BD-RE or BD-R but also return light of a cutting machine is to be evaluated after being converted from an analog signal to a digital signal.

The invention claimed is:

1. In a disk signal evaluation apparatus for recording data formatted logically according to 1-77PP record cording system on a disc by using a bluish-purple laser source and also for checking said data output from a formatter which were formatted logically according to said 1-7PP record coding system, a disc signal evaluation apparatus comprising:
 processing means for receiving said output data from said formatter before recording them on a disc and also for adding checksum to every data unit in a real time; and
 checksum comparing means for comparing the processed data added with said checksum by said processing means with data formed by adding checksum to original data which are supplied to said formatter,
 wherein it is constituted such that normal data of said formatter are to be checked according to the comparison result of said comparing means.

2. A disk signal evaluation apparatus according to claim 1, wherein said processing means records output data from a return light on a disk when recording on said disc and also is processing means for carrying out a process in real time.

3. In a disk signal evaluation apparatus for recording data formatted logically according to 1-77PP record coding system on a disc with addition of checksum by using a bluish-purple laser source and also for checking data output from a formatter which were formatted logically according to 1-77PP record coding system, a disc signal evaluation apparatus comprising:
 processing means for recording output data from said formatter on a disc and also for carrying out a process in a real time;
 comparing means for comparing the processed data in said processing means with original data supplying to the formatter; and
 checksum comparing means for comparing said checksum in incremental steps,
 wherein it is constituted such that normal data of said formatter are to be checked according to said checksum comparing means.

4. A disk signal evaluation apparatus according to claim 3, wherein said processing means records output data from a return light on a disc when recording on said disc and also is processing means for carrying out a process in real time.

5. In a disc signal evaluation apparatus for recording data formatted logically according to 1-77PP record coding system on a disc by using a bluish-purple laser source and also for checking said data output from a formatter which were formatted logically according to said 1-77PP record coding system, a disc signal evaluation apparatus comprising:
 encryption processing means for applying encryption to said disc for copy protection;
 decryption processing means for decryption-processing output data of a standard disc which is recorded by said logic formatter; and
 comparing means for comparing decryption processed data in said decryption processing means with original data supplied to said formatter,
 wherein it is constituted such that normal data of the formatter are to be checked according to said comparing means.

6. A disc signal evaluation apparatus according to any one claim form claim 1 to claim 5, wherein said comparing means is constituted so as to compare contents in the processed data of said processing means and in the original data.

7. In a disk signal evaluation method for recording data formatted logically according to 1-77PP record coding system on a disc by using a bluish-purple laser source and also for checking said data output from a formatter which were formatted logically according to said 1-77PP record coding system, a disc signal evaluation method comprising:
 a processing step for receiving said output data from said formatter before recording them on a disc and also for adding checksum to every data unit in real time; and
 a comparing step for comparing the processed data added with said checksum by said processing means with data formed by adding checksum to original data which are supplied to said formatter,
 wherein it is constituted such that normal data of said formatter are to be checked according to the comparison result of said comparing step.

* * * * *